United States Patent [19]
Smith

[11] Patent Number: 5,983,940
[45] Date of Patent: Nov. 16, 1999

[54] SPRING BIASED ROTARY AIR VALVE

[75] Inventor: Rodney F. Smith, Seymour, Tenn.

[73] Assignee: National Seating Company, Vonore, Tenn.

[21] Appl. No.: 09/159,036

[22] Filed: Sep. 23, 1998

Related U.S. Application Data

[63] Continuation-in-part of application No. 08/955,310, Oct. 21, 1997, abandoned.

[51] Int. Cl.$^6$ ................................................ F16K 11/085
[52] U.S. Cl. ................. 137/625.22; 251/313; 297/284.6
[58] Field of Search ...................... 137/625.22; 251/313; 297/284.6, DIG. 3

[56] References Cited

U.S. PATENT DOCUMENTS

| | | | |
|---|---|---|---|
| 2,094,926 | 10/1937 | Nutter et al. | 251/76 |
| 2,200,396 | 5/1940 | Martin | 250/33 |
| 2,394,487 | 2/1946 | Rotter et al. | 277/46 |
| 2,485,504 | 10/1949 | Morgan | 251/76 |
| 2,531,511 | 11/1950 | Hill | 121/46.5 |
| 2,594,664 | 4/1952 | Livers et al. | 121/46.5 |
| 2,623,724 | 12/1952 | Downey | 251/113 |
| 2,858,851 | 11/1958 | Holl | 137/625.18 |
| 2,911,006 | 11/1959 | Vogel | 137/622 |
| 2,942,584 | 6/1960 | Rethmeier | 121/46.5 |
| 2,979,080 | 4/1961 | Hewitt | 137/620 |
| 2,998,828 | 9/1961 | Hare | 137/625.25 |
| 3,070,960 | 1/1963 | Ternent | 60/54.5 |
| 3,150,517 | 9/1964 | Kuffer et al. | 73/23.1 |
| 3,285,281 | 11/1966 | Pribonic et al. | 137/596 |
| 3,324,888 | 6/1967 | Henderson | 137/625.68 |
| 3,382,733 | 5/1968 | Miller et al. | 74/543 |
| 3,432,141 | 3/1969 | Irti et al. | 251/172 |
| 3,443,592 | 5/1969 | Felmlee | 137/625.11 |
| 3,530,893 | 9/1970 | Masuda | 137/625.25 |
| 3,763,891 | 10/1973 | Stiltner | 137/625.18 |
| 3,776,276 | 12/1973 | Stiltner | 137/625.18 |
| 3,959,024 | 5/1976 | Kirk et al. | 137/625.25 |
| 4,270,849 | 6/1981 | Kalbfleisch | 251/313 X |
| 4,340,203 | 7/1982 | Donner | 251/322 |
| 4,524,951 | 6/1985 | Green et al. | 251/327 |
| 4,566,628 | 1/1986 | Latarius | 237/8 C |
| 5,261,454 | 11/1993 | Pavlica et al. | 137/625.48 |
| 5,388,606 | 2/1995 | Banks | 137/38 |
| 5,447,178 | 9/1995 | Gabrlik et al. | 137/625.25 |

FOREIGN PATENT DOCUMENTS

| | | |
|---|---|---|
| 1479233 | 5/1967 | France . |
| 349387 | 3/1922 | Germany . |
| 698388 | 10/1953 | United Kingdom . |
| 2073371 | 10/1981 | United Kingdom . |

*Primary Examiner*—Robert M. Fetsuga
*Attorney, Agent, or Firm*—Fitch, Even, Tabin & Flannery

[57] ABSTRACT

There is provided a low profile valve assembly for controlling flow of air and the like. The valve assembly includes a housing defining inlet and outlet ports and a valve operator located within the housing. The operator includes a body portion seated in the housing with an axis of rotation and defining an internal passage with inlet and outlet ends. An actuator rotates the body portion a first predetermined distance to a fill position to allow flow through the internal passage and a second predetermined distance opposite the first direction to a vent position to allow flow to vent from the valve assembly through the outlet end. A spring extends from the valve operator adjacent the body portion between the axis of rotation and the valve housing. The spring extends partially about the axis of rotation to bias the body portion to an off position to substantially prohibit flow through the valve operator when the body portion is not being actuated to the fill and vent positions. The spring operates substantially within an internal space in the operator about the axis of rotation. The valve assembly includes an orifice to reduce volume flow through the valve assembly and an exhaust passage portion to reduce flow pressure between the inlet and outlet ends.

42 Claims, 4 Drawing Sheets

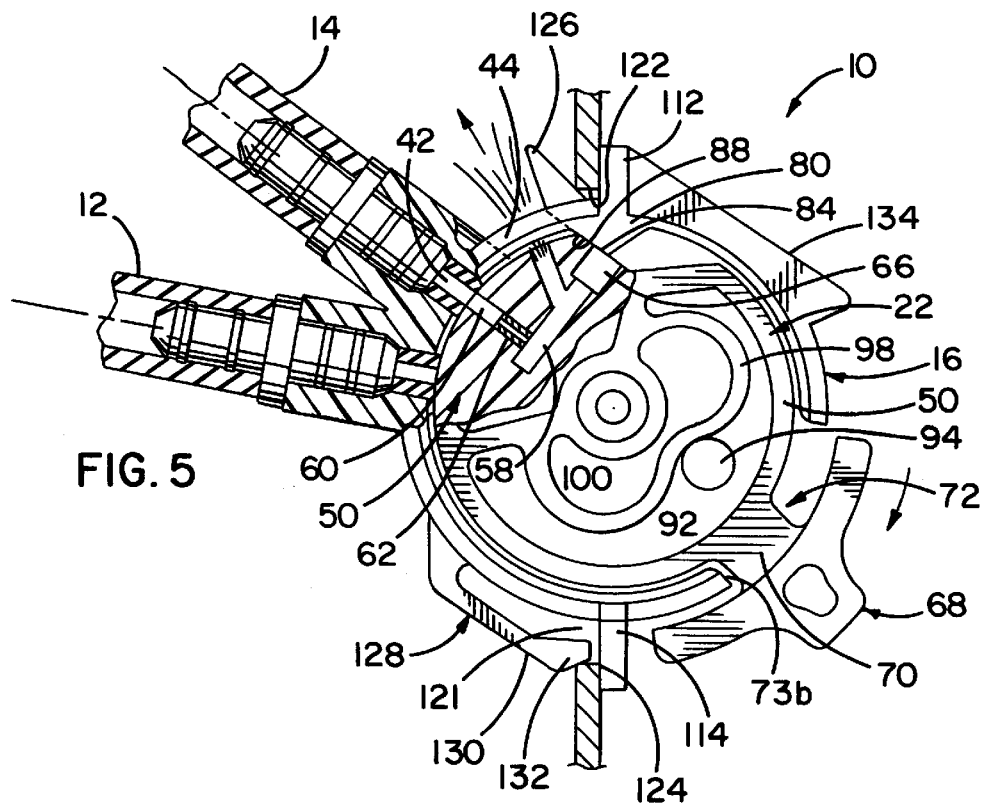
FIG. 5
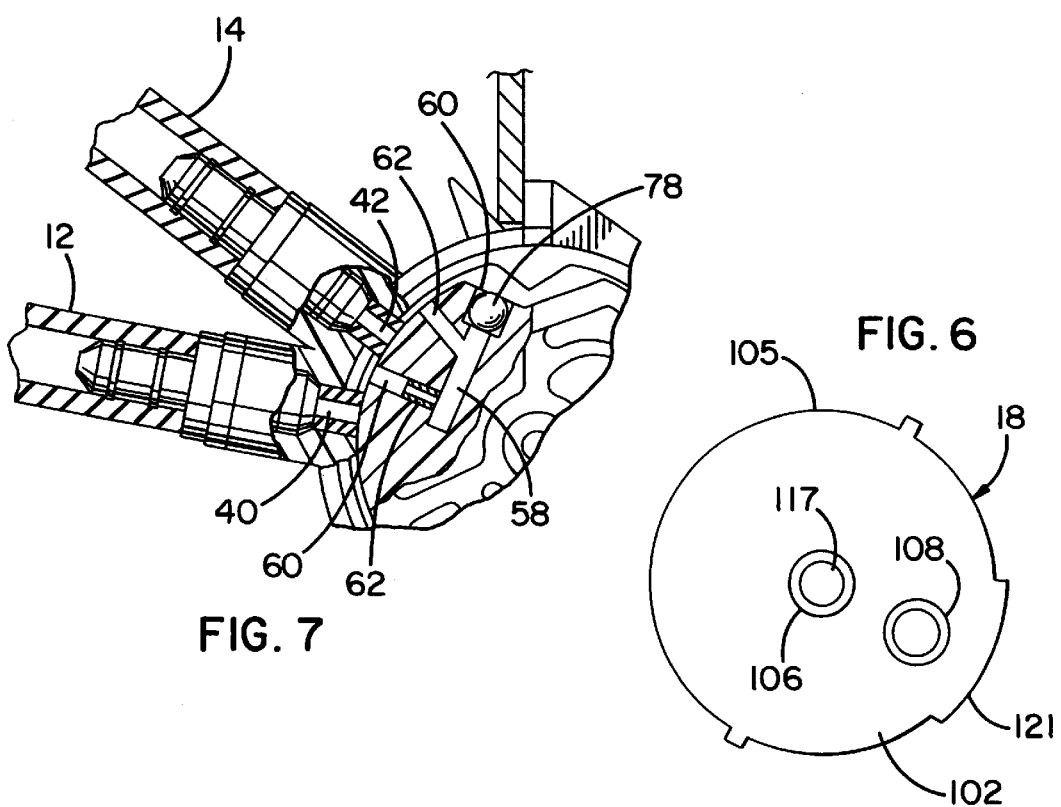
FIG. 7
FIG. 6

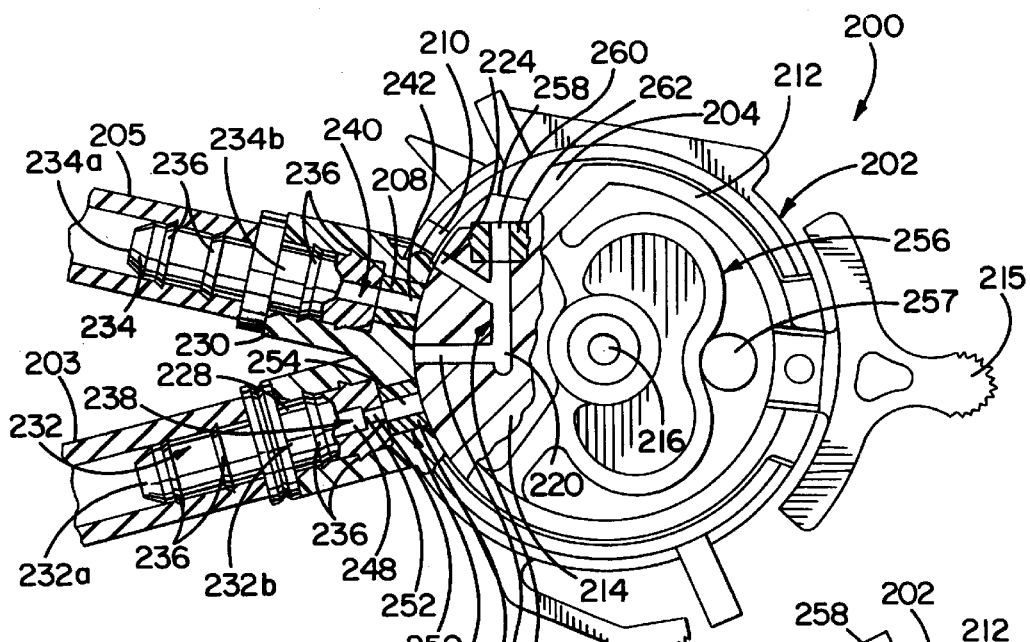
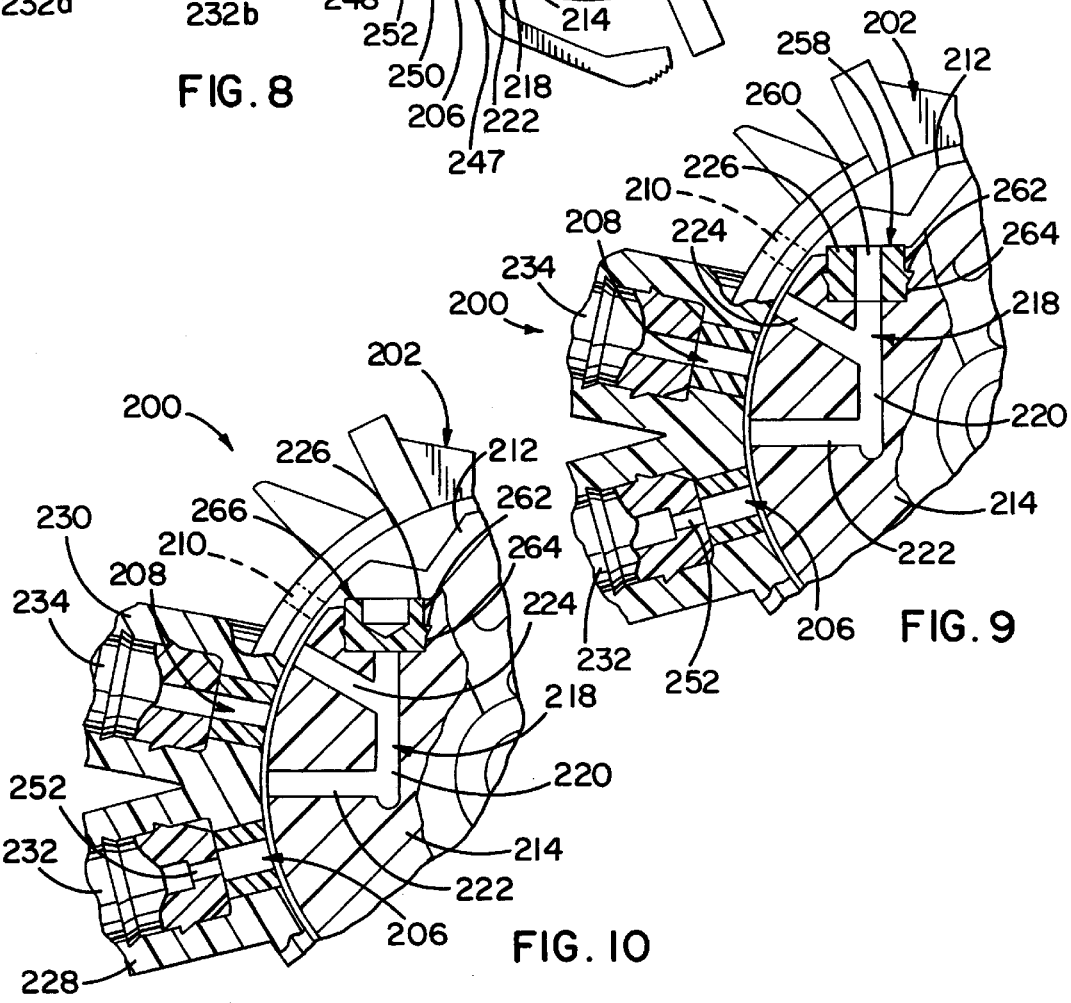

SPRING BIASED ROTARY AIR VALVE

CROSS-REFERENCE TO RELATED APPLICATION

This is a continuation-in-part of application Ser. No. 08/955,310, filed Oct. 21, 1997 and entitled "SPRING BIASED ROTARY AIR VALVE", abandonded.

FIELD OF THE INVENTION

The present invention relates to valves and, more particularly, to a valve for controlling air flow with a rotary valve passage body that is naturally biased to an off position when not being actuated for air flow therethrough.

BACKGROUND OF THE INVENTION

As flow control devices, valves are commonly employed to regulate the flow of gases in a variety of machinery systems. One such application is to control the flow of air to adjust a lumbar support system found in seating systems in tractor trailer trucks. These lumbar systems typically include bladders that are inflated and deflated to adjust the lumbar support. For use in trucks of this nature, it is important that the valve be capable of performing as a high/low pressure valve to reduce the truck's supply pressure so as not to damage the bladder of the lumbar support during inflation. The operating air system of a truck of this nature is typically running in the range of 90 to 120 psi, and a conventional bladder has a maximum operating pressure of about 15 psi. Thus, it is necessary to significantly reduce the truck's pressure supply for use in the lumbar support of the seating system.

Further, valves used in seating systems must be reliable and durable enough to withstand heavy and repeated use. Therefore, for a valve to last at least five years, it must be durable enough to operate for many thousands of actuations.

Furthermore, these valves must be relatively compact for incorporation in the limited space allocated to seating systems. For instance, in a truck seating system, the control valve is typically located along the side of the seat below seating surface. Thus, the valve must be sufficiently compact in order to be effectively mounted for convenient operation at this location.

Moreover, in addition to these necessary functional and size requirements, cost is of significant consideration in vehicle seating design and manufacturing. It is important that the cost of each component of the seating support system be considered closely. As a consequence, the desired valve design would incorporate as few parts as necessary, while still meeting the durability levels and being cost effective to assemble and manufacture.

Slide valves are a common type of air valve being used to control the lumbar support of truck seating systems. A typical slide valve includes a slide mounted for linear movement in a valve body, and during operation, the passenger shifts the slide manually in one direction to allow air to flow through the valve to inflate the bladder and in an opposite direction to allow the air to flow to deflate the bladder. The slide is naturally biased to an off position to retain the latest setting for the lumbar support bladder. Typically, a coil type spring is used to provide the biasing force to automatically shift the slide linearly to the off position between the fill and vent position. An advantage of being biased automatically to the off position is that the operator does not have to consciously shut off the valve, which, consequently, precludes the accidental introduction and release of air as a result of a failure to shut off the valve. Examples of slide valves are disclosed in U.S. Pat. No. 5,447,178, issued to Gabrlik et al., on Sep. 5, 1995, and U.S. Pat. No. 4,524,951, issued to Green et al., on Jun. 25, 1985.

Rotary valves are another type of valve commonly employed for controlling air flow. A typical rotary valve assembly includes a valve disk mounted for rotation in a valve body. The disk includes a number of passages and rotates in the valve body to interconnect the passages to control air flow through the valve assembly. An example of a rotary valve is disclosed in U.S. Pat. No. 3,443,592, issued to Felmlee, on May 13, 1969, which discloses a spring for biasing a sealing arrangement between the stacked components, and not for biasing rotation.

A known shortcoming found with both the slide and rotary valves is the tendency to be relatively expensive to manufacture and assemble. This is due, in part, to the inclusion of a relatively significant number of independent, delicate components, including spring arrangements where the spring requires its own operating space adjacent the valve operator and preloading during assembly. Further, this renders the valve assembly bulky. Moreover, it has been found that these intricate valve designs are significantly more susceptible to failure, such as spring fatigue, and requiring repair or replacement.

Thus, the present invention is directed to providing a valve assembly which is less expensive to manufacture and that has a compact design with a more integral spring design that is durable and reliable in heavy use situations, such as tractor trailer truck seating systems.

SUMMARY OF THE INVENTION

The present invention is directed to a durable and reliable valve assembly for controlling flow of air and the like in heavy use situations. The valve assembly includes a valve housing that defines inlet and outlet ports. A valve operator is located within the valve housing and includes a body portion that is seated in the valve housing for movement about an axis of rotation adjacent the body portion. The body portion defines an internal passage with an inlet end and an outlet end. An actuator rotates the body portion a first predetermined distance to a fill position and a second predetermined distance to a vent position.

In the fill position, the inlet end of the internal passage aligns with the inlet port and the outlet end aligns with the outlet port to allow flow through the valve assembly. In the vent position, the inlet end aligns with the outlet port to allow flow to vent from the valve assembly through the outlet end.

When the body portion is not being actuated to either the fill or vent position, a spring, extending from the valve operator adjacent the body portion between the axis of rotation and the valve housing, biases the body portion to an off position between the fill and vent positions to prohibit flow through the internal passage. The spring also extends at least partially about the axis of rotation.

The valve operator also may include an outer collar portion that defines an inner space extending partially about the axis of rotation. The spring is located within the inner space to bias the body portion to the off position and, also, may be integrally formed from the valve operator.

When the body portion is rotated to the fill and vent positions, the spring deforms toward the axis of rotation. That is, the spring also may include a plurality of lobes that extend partially about the axis of rotation, and at least two of the lobes may have at least one intersection that shifts toward the axis of rotation when the body portion is rotated to the fill and vent positions.

Further, the lobes forming the at least one intersection extend from the body portion. The valve housing may also include a stop extending between the at least two lobes at the at least one intersection. The spring engages the stop to maintain the body portion in the off position when not being actuated to either the fill or vent position. The stop, however, deforms the spring and causes the at least one intersection to shift toward the axis of rotation when the body portion is actuated to the fill and vent position.

The internal passage also may include an orifice to reduce flow volume through the passage. Moreover, the internal passage may have an exhaust passage to reduce pressure of the reduced flow volume between the inlet and outlet ends. The internal passage also may include radially extending inlet and outlet portions terminating with the inlet and outlet ends, respectively. The inlet and outlet portions are substantially perpendicular to the axis of rotation. The internal passage also may include a portion with a varying cross-section diameter.

The orifice may be located within the inlet portion. Alternatively, the orifice may be located within the housing to reduce the air flow through the valve assembly. The orifice may be located in the housing before the inlet port. The valve assembly also may include a supply line coupling attached to the valve housing at the inlet port, and the orifice may be located in the supply line coupling.

A plug may be fitted into the exhaust portion of the internal passage to restrict exhaust flow during filling operations. An alternate plug may be used to substantially prevent exhaust flow through the exhaust portion.

In another form, there is a valve assembly with a valve housing having an internal arcuate guide surface and defining inlet and outlet ports. A valve operator with top and bottom arcuate edge portions is located in the valve housing and also defines an internal passage that is guided by the internal arcuate guide surface for movement about an axis of rotation through the valve assembly. The internal passage includes inlet and outlet ends.

An actuator rotates the internal passage of the valve operator about the axis of rotation between fill and vent positions. In the fill position, the inlet end of the internal passage aligns with the inlet port and the outlet end aligns with the outlet port to allow flow through the valve assembly. In the vent position, the inlet end aligns with the outlet port to allow flow to vent from the valve assembly through the outlet end. A spring located within the valve operator generally between the top and bottom arcuate edges of the valve operator biases the internal passage to an off position to substantially prohibit flow through the internal passage when the internal passage is not actuated to the fill and vent positions.

The spring may extend partially about the axis of rotation to bias the internal passage to the off position, which may be located intermediate the fill and vent positions. The valve operator also may define an exhaust passage in communication with the internal passage. The exhaust passage allows a portion of the flow to exit the valve assembly to reduce the pressure between the inlet end and the outlet end of the internal passage when the internal passage is set to the fill position.

The internal passage also may include an orifice to reduce flow volume through the internal passage. Alternatively, the valve housing may include the orifice and the orifice may be positioned before the inlet port to reduce the air flow into the internal passage of the valve operator. The valve assembly may also include a supply line coupling attached to the valve housing at the inlet port, and the orifice may be located within the supply line coupling.

The valve housing may include a spring stop, and the spring may include a pair of arcuate segments with an intersection at a first predetermined distance from the axis of rotation. When the internal passage is actuated to the fill and vent positions, the spring stop shifts the intersection to a second predetermined distance from the axis of rotation, which is less than the first predetermined distance. The valve assembly may also include a removable cover that attaches to the valve housing to extend over the spring.

In an even further form, there is a valve assembly with a valve housing defining an internal cavity and inlet and outlet ports. A valve operator with an inner collar, an outer collar with top and bottom edge portions and a body portion extending between the inner and outer collars is mounted in the internal cavity for movement about an axis of rotation. The body portion defines an internal passage with inlet and outlet ends. The inner and outer collars define an open area adjacent the body portion.

The valve assembly also includes an actuator for rotating the body portion of the valve operator in a first predetermined direction to a fill position and a second predetermined direction opposite the first direction to a vent position. In the fill position, the inlet end of the internal passage aligns with the inlet port of the valve housing and the outlet end of the internal passage aligns with the outlet port of the valve housing to allow flow through the housing. In the vent position, the inlet end of internal passage aligns with the outlet port of valve housing to allow flow to vent from the valve assembly through the outlet end of the internal passage.

A spring is provided to bias the body portion to a center position between the fill and vent positions to prevent flow through the valve body portion when the body portion is not being actuated to the fill and vent positions. The spring is located within the valve operator in the open area and generally between the top and bottom edges of the outer collar.

The spring also may include a pair of lobes that extend partially about the axis of rotation and have an intersection spaced a predetermined distance from the axis of rotation. The valve housing also may have a spring stop that extends into the cavity at the intersection between the lobes of the spring to engage the lobes to maintain the body portion in the center position when the body portion is not actuated to the fill and vent positions. The stop may deform the spring and cause the intersection between the lobes to shift toward the axis of rotation when the body portion is actuated to the fill and vent positions. The valve housing also may include a rotational stop extending into the cavity for engagement with the outer collar of the valve operator to limit rotational movement of the body portion about the axis of rotation in the first direction to the fill position and in the second direction to the vent position. The internal passage also may include an orifice to reduce air flow volume between the inlet and outlet ends and an exhaust passage after the orifice to reduce air pressure between the inlet and outlet ends.

BRIEF DESCRIPTION OF THE DRAWINGS

The present invention will be described in connection with the accompanying drawings wherein:

FIG. 5 is a top plan view of the valve assembly of FIG. 1 with the cover removed and the rotary valve operator partially cut away to illustrate a vent position of the valve assembly;

FIG. 6 is a bottom view of the cover of the valve assembly of FIG. 1;

FIG. 7 is a partial, top plan view of the valve assembly of FIG. 1 with the cover removed and the rotary valve operator partially cut away to illustrate the rotary valve operator in the center position and modified for substantially constant pressure therethrough for filling;

FIG. 8 is a top plan view of an alternative valve assembly with the cover removed to illustrate the center (off) position of the valve assembly;

FIG. 9 is a partial top plan view of the valve assembly of FIG. 8 to illustrate a low pressure valve system; and FIG. 10 is a partial top plan view of the valve assembly of FIG. 8 to illustrate a high pressure valve system.

DETAILED DESCRIPTION OF THE PREFERRED EMBODIMENT

Figure 1:
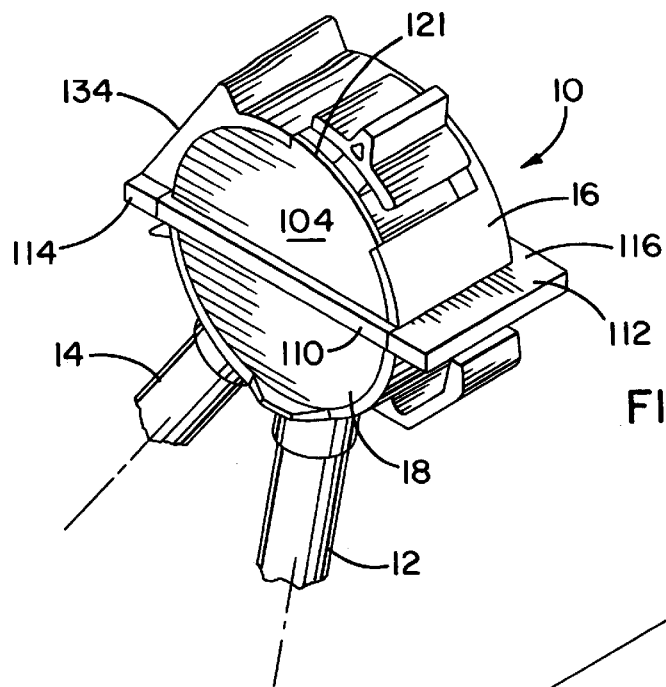
FIG. 1 is a perspective view of a valve assembly embodying features of the present invention.
Figure 2:
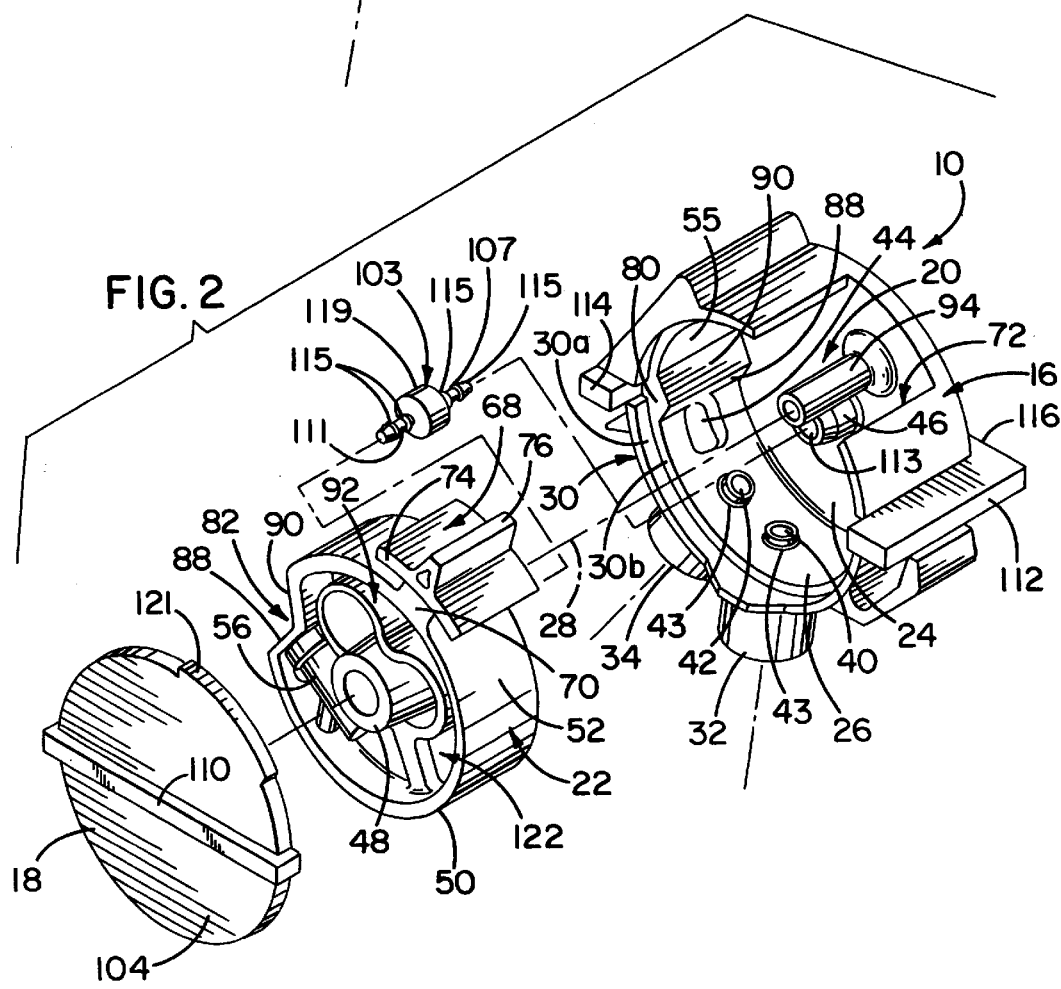
FIG. 2 is an exploded perspective view of the valve assembly of FIG. 1 illustrating a cover, a rotary valve operator and a valve housing.

Referring to FIGS. 1 and 2 of the drawings, there is illustrated an air valve assembly 10 embodying features of the present invention. The valve assembly 10 has generally a compact disk-like profile and is made with a sturdy construction and reliable operation well suited for use in seating systems. In operation, the valve assembly 10 easily controls filling of a bladder (not shown) commonly used in a lumbar support feature of a truck seating system. A supply line 12 allows air to flow from a supply (not shown) to the valve assembly 10, and then air flows from the valve assembly 10 to the bladder through a vent line 14. The valve assembly 10 is capable of reducing supply pressure to fill the lumbar bladder at a significantly reduced pressure.

The valve assembly 10 includes a valve housing 16 and a cover 18 defining an internal cavity 20. A valve disk 22 having a generally wedged valve body 56 sits in the cavity for rotation about a center axis 28 extending through the center of the valve body 16. The disk 22 is rotated counterclockwise in the cavity 20 to shift the valve body 56 to a fill position (FIG. 4) and clockwise to shift the valve body 56 to a vent position (FIG. 5). In the fill position, the valve body 56 allows air from the supply line 12 to flow through the valve assembly 10 to the vent line 14. In the vent position, the valve body 56, however, only allows air from the vent line 14 to flow into the valve assembly 10 to be exhausted to the atmosphere.

Figure 3:
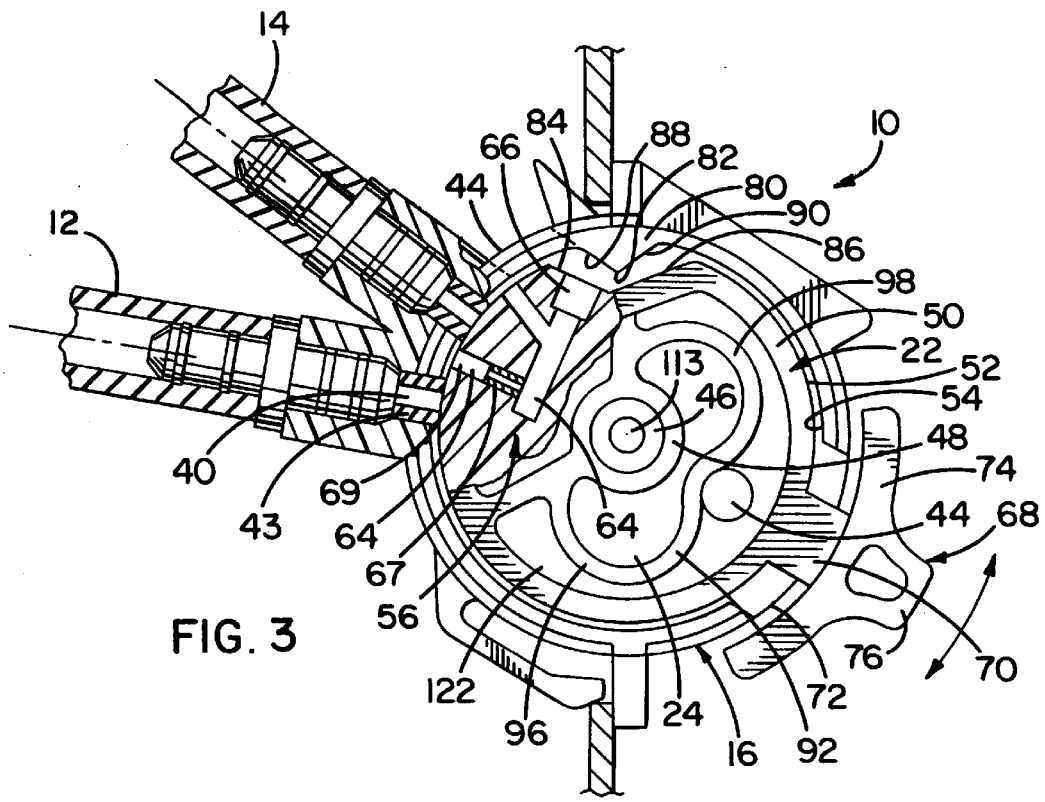
FIG. 3 is a top plan view of the valve assembly of FIG. 1 with the cover removed and the rotary valve operator partially cut away to illustrate a center (off) position of the valve assembly.

When not actuated to the fill and vent positions, a spring 92, disposed entirely within the general boundaries of the cavity 20, automatically biases the rotary disk 22 to a center (off) position intermediate the fill and vent positions (FIG. 3). In the center position, the valve body 56 prohibits air flow through the valve assembly 10.

The valve housing 16 includes a substantially circular bottom wall 24 and annular sidewall 26 that extends generally perpendicularly from the perimeter of the bottom wall 24. The side wall 26 has a stepped edge 30 with an annular sidewall portion 30a and an annular base portion 30b generally perpendicular to the sidewall portion 30a. The cover 18 rests on the base portion 30b and forms a friction fit with the sidewall portion 30a. The bottom wall 24, the sidewall 26 and the cover 18 define the cavity 20 of the valve housing 16 with a general hollow, disk-like shape.

Figure 4:
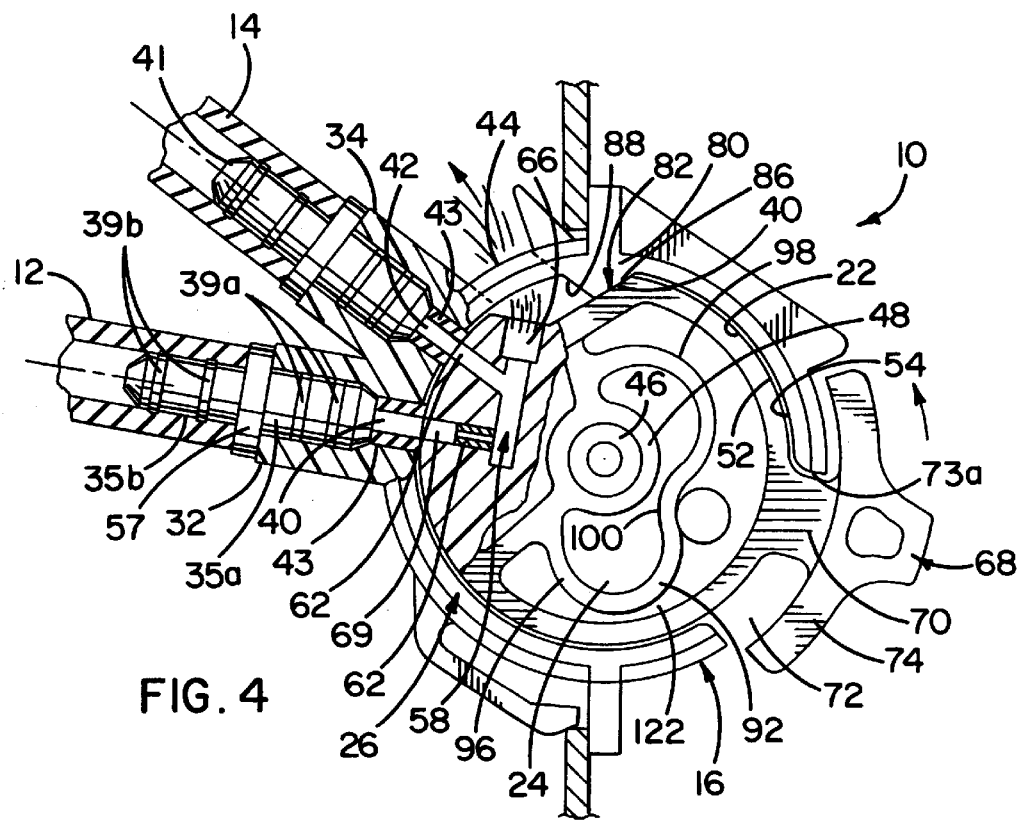
FIG. 4 is a top plan view of the valve assembly of FIG. 1 with the cover removed and the rotary valve operator partially cut away to illustrate a fill position of the valve assembly for reduced pressure flow therethrough.

Referring to FIGS. 2 and 4, the valve housing 16 includes a circular inlet socket 32 and an adjacent circular outlet socket 34. The sockets 32 and 34 extend radially from the exterior of the sidewall 26, and each is fitted with a barbed fitting 35 designed to interconnect the supply line 12 and the vent line 14, respectively, to the valve housing 16. Each of the barbed fittings 35 includes a first end 35a designed to be inserted into the sockets 32 and 34 and a second end 35b with a reduced outer diameter over which the lines 12 and 14 fit. The first end 35a and the second end 35b of each barb 35 are separated by an annular collar 37.

In interconnecting the sockets 32 and 34 and the lines 12 and 14, the first end 35a of each barb 35 is inserted into the sockets 32 and 34 until the annular collar 37 engages the distal end of the socket 32 and 34. The first end 35a includes a pair of annular barbs 39a that allow for insertion, but prevent removal of the fitting from the sockets 32 and 34. The second ends 35b and each barb 35 projects from the respective socket 32 and 34 and also includes a pair of barbs 39b that allow the lines 12 and 14 to slide over, but prevent their disconnection. The barbed fittings 35 also include an internal longitudinal passage 41 to allow air flow through the sockets 32 and 34. The preferred barbed fitting is made of brass CA360 or CA345. The sockets 32 and 34 are substantially identical.

A circular inlet port 40 and a circular outlet port 42 also extend radially through the sidewall 26 in axial alignment with the inlet and outlet sockets 32 and 34, respectively, and in particular, with the fitting passages 41. The inlet and outlet ports 40 and 42 have the same general inner diameter, which is significantly less than the inner diameter of the sockets 32 and 34 and are spaced a predetermined angular distance apart. For instance, the preferred predetermined angular distance is approximately 27±3 degrees.

The inlet and outlet ports 40 and 42 are lined with a seal 43 in the form of a sleeve. For each port 40 and 42, the seal 43 is pressed from the cavity 20 side into the ports 40 and 42 until it bottoms out against the first end 35a of the barbed fitting 35. The seal 43 is longer than the length of the ports 40 and 42 to extend into the cavity 20 slightly to seal the ports 40 and 42 against the valve disk 22. The preferred seal is made from Buna N (Nitrile) 65–70 Durom or Ethylene Propylene (EPDM).

An exhaust port 44 extends through the sidewall 26 adjacent the outlet port 42 and has a generally rectangular configuration. As described in further detail below, the exhaust port 44 cooperates with the valve passage body 56 to enable the valve assembly 10 to operate as a high-low pressure valve by reducing the pressure between the inlet port 40 and the outlet port 42 when the valve assembly 10 is in the fill position. The exhaust port 44 also exhausts air to the atmosphere when the valve assembly 10 is in the vent position (FIG. 5).

Referring to FIGS. 2 and 3, the rotary valve disk 22 sits in the cavity 20 on the bottom wall 24 of the valve housing 16 and rotates about a post 46 projecting from the bottom wall 24 at a generally central location. The post 46 projects inward less than half of the height of the side wall 26 and along the axis of rotation for the rotary valve disk 22. The rotary valve disk 22 includes an inner annular collar 48 and an outer collar 50. The inner collar 48 is designed to slide over and encircle the post 46, but allows rotation of the disk 22 in the valve housing 16. The outer collar 50 includes an outer surface 52 that defines the outer perimeter of the rotary valve disk 22 and that slides against an inner surface 54 of the sidewall 26 during rotation of the disk 22.

The thickness of the disk 22 is such that it resides completely within the cavity 20 of the valve housing 16 and below the stepped edge 30 of the sidewall 26 to permit the cover 18 to set on the stepped edge 30. For instance, the preferred valve housing includes a maximum thickness of about 0.870±0.0025 in. and outer diameter of about 1.340±0.0023 in. The preferred cavity in the valve housing has a maximum depth of about 0.670±0.0024 in. and an inner diameter of about 1.250±0.0025 inches (in.). The rotary valve disk may have an outer diameter of about 1.240±0.0025 in. and a maximum height at the inner collar of about 0.475±0.0025 and at the outer collar of about 0.410±0.0025 in. A lubricant, such as silicon, is provided in the cavity to enhance the smooth operation and sealing of the valve operator.

The valve passage body 56 of the valve disk 22 widens as it extends radially outward from the inner collar 48 to the outer collar 50. The valve passage body 56 includes an internal passage 58 with a circular cross-section that has a main portion 64 interconnecting an inlet portion 60 and an outlet portion 62. The main portion 64 extends generally linearly between the inlet and outlet portions 60 and 62 and terminates beyond the outlet portion 62 with an exhaust portion 66. The inlet and outlet portions 60 and 62 extend radially outward and are generally spaced the same predetermined angular distance as the inlet and outlet ports 40 and 42 of the valve body 16.

The diameter of the main portion 64 and the outlet portion 62 are generally identical. The diameter of the exhaust portion is larger than the main portion 64 to enhance exhausting of air from the valve passage body without undesired restriction. The diameter of the inlet and outlet portions 60 and 62, main portion 64, exhaust portion 66 and the inlet and outlet ports 40 and 42 are coordinated to be capable of reducing the pressure between the inlet and outlet ports 40 and 42. To provide the desired pressure reduction, a segment of the inlet portion 60 has a reduced diameter to create an orifice 69 to decrease the volume of air flow into the valve passage body 56. The orifice 69 is created from a reduction in diameter at the longitudinal midpoint of the inlet portion 60. The orifice 69 reduces the volume of air flow into the main portion 64 of the internal passage 58. This controlled volume reduction enables sufficient air to flow to the atmosphere through the exhaust portion 66 and the exhaust port 44 to obtain the desired pressure reduction between the supply line 12 and vent line 14 during filling operations.

For example, when the generally common diameter among the inlet, outlet and main portions 60, 62 and 64 is 0.060±0.0025 in., the reduction of diameter in the inlet portion 60 is designed to reduce the diameter of the inlet portion to 0.040±0.0025 in. to create a sufficient reduction in air flow volume so that enough air is able to exhaust from the exhaust portion 66 to create a desired pressure reduction, such as from about 90–120 psi at the supply line to about 3.5 to 9.0 psi at the vent line for proper filling of a bladder having a maximum operating pressure in the approximate range of 15 psi. The inlet portion may be manufactured with a stepped drill bit. Alternatively, the inlet portion 60 may lined with a tubular step pin 67 to reduce the diameter of the inlet portion 60 at approximately its longitudinal midpoint between the inlet port 40 and the main port 64.

Referring to FIGS. 2 and 3, the rotary valve disk 22 includes an actuator arm 68 generally diametrically opposite the valve passage body 56 for manually rotating the rotary valve disk 22 to the fill and vent positions. The actuator arm 68 is interconnected to the outer surface 52 of the outer collar 50 by a neck portion 70 extending radially therebetween. The neck portion 70 extends through an arcuate slot 72 formed through the sidewall 26 of the valve housing 16. The neck portion 70 terminates outside the valve housing 16 with an arcuate knob 74 generally tracking the curvature of the sidewall 26. The arcuate knob 74 also includes an outer rib 76 which extends generally parallel to the axis of rotation for the valve disk 22 for ease of gripping by an operator. The slot 72 extends angularly a sufficient range to allow the neck portion 70 freedom to rotate the rotary valve disk 22 to the fill and vent positions.

Referring to FIG. 4, the actuator arm 68 is used to manually rotate the rotary valve disk 22 counter-clockwise a predetermined angular distance from the center position to set the fill position. For example, this angular distance may be about 13.0±1.0 degrees. As illustrated, the fill position has the inlet and outlet portions 60 and 62 of the internal passage 58 aligned radially with the inlet and outlet ports 40 and 42, respectively. As a result, air flows from the supply line 12 through the valve assembly 10 to the bladder via the vent line 14.

As discussed above, the valve assembly 10 reduces the pressure of the air venting through the outlet port 42 by reducing volume flow and allowing a portion of the air to exhaust to the atmosphere through the exhaust portion 66 of the internal passage 58 and the exhaust port 44 of the valve body 16. Consequently, the valve assembly 10 operates as a high pressure in and low pressure out type valve so that the bladder fills under a lower pressure than the pressure of the air flow at the inlet port 40.

Referring to FIG. 7, the exhaust portion 66 of the internal passage 58, however, may be closed or otherwise sealed off with a stop 78. The preferred stop takes the form of a ball that is pressed into the exhaust portion 66 with a friction fit. The size of the ball must be large enough relative to the diameter of the exhaust port 66 so that the ball cannot be blown out. The effect is to convert the valve assembly 10 to a high pressure in and high pressure out type valve so that the air flowing through the outlet port 42 has generally the same pressure through the valve assembly.

Referring to FIG. 5, the actuator arm 68 is used to manually rotate the rotary valve disk 22 clockwise the same predetermined angular distance from the center position to set the vent position. For example, this angular range may also be approximately 13.0±1.00 degrees. As illustrated, the vent position has the inlet portion and outlet portion 60 and 62 of the internal passage 58 align with the outlet port 42 and exhaust port 44, respectively, of the valve housing 16. As a result, the outer annular collar 50 at the valve passage body 56 seals the inlet port 40, and air is permitted to flow only from the vent line 14 through the valve assembly 10 to the atmosphere via the outlet portion 62 and the exhaust port 44 under pressure applied by the bladder.

Referring to FIGS. 2 and 3, the valve housing 16 and the rotary valve disk 22 include cooperating stop surfaces for limiting rotation of the rotary valve disk 22 to precisely locate the inlet and outlet portions 60 and 62 in both the fill and vent positions. The stop also prevents the valve disk 22 from being situated improperly in the cavity 20. More particularly, the valve housing 16 includes a wedged shaped stop 80 tapering inward from the side wall 26 into the cavity 20. To limit rotation, the stop 80 is designed to engage a complementary wedge shaped recess 82 defined by the outer collar 50 of the rotary valve disk 22 at the exhaust portion 66 of the internal passage 58.

The recess 82 tapers inward toward the inner collar 48 and includes left and right generally planer surfaces 84 and 86 disposed at a predetermined angle relative to one another with the exhaust portion 66 extending through the left surface 84. The stop 80 includes similar left and right planar surfaces 88 and 90, respectively, also disposed at a predetermined angle relative to one another so to complement the angle between the recess surfaces 84 and 86 so to stop rotation in either direction. When the rotary valve disk 22 is in the center position, there is a predetermined clearance between the left surfaces 84 and 88 of the stop 80 and recess 82, on one side, and the right surfaces 86 and 90, on the other side. This clearance is designed to permit only the requisite rotation in either direction to accurately set the fill and vent positions of the inlet and outlet portion 60 and 62 of the internal passage 58 in the valve passage body 56.

Referring to FIG. 4, when the rotary valve disk 22 is set to the fill position, the right surface 86 of the recess 82 rotates across the clearance at the right side of the stop 80 to engage the right surface 90 of the stop 80. This ensures that the inlet and outlet portions 60 and 62 of the internal passage 58 align with the inlet and outlet ports 40 and 42 of the valve housing 16 and that the exhaust portion 66 of the internal passage 58 is spaced from the left surface 88 of the stop 80 to allow air to exhaust through the exhaust port 44. The left surface 88 also deflects air from the cavity 20 through the exhaust port 44. In addition to the engagement between the stop 80 and the recess 82, the rotation of the valve disk 22 may also be limited by the neck 70 of the actuator arm 68 engaging a side edge 73*a* of the arcuate slot 72.

Referring to FIG. 5, when the rotary valve disk 22 is set to the vent position, the left surface 84 of the recess 82 rotates across the clearance on the left side of the stop 80 to engage the left surface 88 of the stop 80. This surface engagement ensures that the inlet portion 60 of the internal passage 58 aligns with the outlet port 42 and the exhaust portion 66 of the internal passage 58 is at least partially impeded by the left surface 88 of the stop 80. In addition to the engagement between the stop 80 and the recess 82, the rotation of the valve disk 22 may also limited by the neck 70 of the actuator arm 68 engaging a side edge 73*b* of the arcuate slot 72.

While the preferred embodiment is to use both the engagement combination of the stop 80 and recess 82 and the neck 70 and slot 72, either one of these alone will also suffice.

Referring to FIGS. 2 and 3, the rotary valve disk 22 defines an open space 122 between the inner collar 48 and the outer collar 50. The spring 92 extends from the valve passage body 56 to reside primarily in the open space 122 to bias the rotary valve disk 22 to the center position between the fill and vent positions.

More specifically, the spring 92 extends integrally from the valve passage body 56 about a portion of the inner collar 48 in the open space 122. The spring 92 has a butterfly-like shape formed by a first lobe 96 and a second lobe 98 intersecting with a valley 100 therebetween. The first and second lobes 96 and 98 are substantially identical except that each extends outward from the valve passage body 56 toward the outer collar 50 in opposite directions, but both turn back short of the outer collar 50 toward the inner collar 48 to intersect at the valley 100. The spring 92 is designed to have a low profile within the rotary valve disk 22, and for instance, the preferred spring may have a maximum thickness of about 0.364±0.0025, which is intended to be less than the overall maximum depth of the cavity 20. The spring 92 also is designed to provide a non-linear biasing force when the valve disk 22 is rotated to the fill and vent positions.

Referring to FIG. 3, the spring 92 cooperates with a spring stop 94 projecting perpendicularly into the cavity 20 from the bottom wall 24 of the valve body 16 between the first and second lobes 96 and 98 in the valley 100. The first and second lobes 96 and 98 and the valley 100 contemporaneously engage the spring stop 94 and provide a sufficient biasing force to maintain the disk rotary valve 22 against unintentional rotational movement from the center position. As a result, the mounting post 46, the valley 100, spring stop 94 and the center of the angular slot 72 for the actuator arm 68 are generally in radial alignment. Further, the inlet and outlet portions 60 and 62 of the internal passage 58 are spaced clockwise from the inlet and outlet ports 40 and 42, respectively, of the valve housing 16. Consequently, the inlet and outlet ports 40 and 42 are closed by the outer collar 50 of the rotary valve body 22 against the seals 43 to prevent flow through the valve assembly 10.

Referring to FIG. 4, in setting the fill position with the actuator arm 68, the first lobe 96 of the spring 92 slides and deforms against the spring stop 94 in resisting the counter-clockwise rotation of the rotary valve disk 22. In the fill position, the first lobe 96 has deformed to extend outward further toward the outer collar 50 than the second lobe 98, and the valley 100 has moved inward toward the inner collar 48 and the axis of rotation.

Referring to FIG. 5, in setting the vent position with the actuator arm 68, the second lobe 98 slides and deforms against the spring stop 94 in resisting the clockwise rotation of the rotary valve disk 22. In the vent position, the first lobe 98 has deformed to extend outward further toward the outer collar 50 than the second lobe 98, and the valley 100 has moved inward toward the inner collar and the axis of rotation.

When the actuator arm 68 is released from the fill or vent positions, the lobes 96 and 98 of the spring 92 bias against the spring stop 94 to return the rotary valve disk 22 to the center position, as illustrated in FIG. 3. In the center position, the spring 92 is not being deformed, and thus, the lobes 96 and 98 have a substantially identical shape.

Referring to FIGS. 2 and 6, the cover 18 has a generally circular and planar configuration defined by an outer perimeter edge 105 that forms a friction fit with the sidewall portion 30*a* of the stepped edge 30 of the side wall 26 of the valve housing 16. The cover 18 includes an inner side 102 facing toward the valve housing 16 to form the cavity 20 for the rotary valve disk 22 and an outer side 104 facing in the opposite direction. The inner side 102 includes a centrally projecting cover post 106 with an upper end being bevelled for insertion into the inner collar 48 of the rotary valve disk 22. That is, the cover post 106 has a diameter similar to the central post 46 of the valve housing 16 and fits into and engages the inner collar 48 in alignment with the central post 46 when the cover 18 is on the valve housing 16. The rotary valve disk 22 rotates about the cover post 106, as well as the center post 46 of the valve housing 16, when being shifted to the fill and vent positions.

In addition to the friction fit, the cover 18 also may be secured to the valve housing 16 with a barbed retainer 103 interconnecting the central post 46 of the valve housing 16 and the cover post 106. The retainer 103 includes a first end 107 for attachment to the central post 46 and an identical second end 111 for attachment to the cover post 106. The cover post 106 includes a central cylindrical hole 113 to receive the first end 107 of the retainer 103. The first end 107 includes a pair of annular barbs 115 that allow insertion into the hole 113, but prevent removal by penetrating into the wall defining the hole 113. The first and second ends 107 and 111 are separated by an annular collar 119 that bottoms out on top of the center post 46 when the first end 107 is inserted all the way into the cylindrical hole 113. Hence, the valve disk 22 also rotates about the retainer collar 119.

The cover post 106 also includes a cylindrical hole 117 to receive the second end 111 of the retainer 103. The second end 111 also includes a pair of annular barbs 115 that allow the cover post 106 to be pressed on the second end 111, but prevent the cover 18 from being removed by penetrating into the annular wall defining the cylindrical hole 117. To facilitate insertion into their respective cylindrical holes 113 and 115, the first and second ends 107 and 111 are chamfered.

The inner side 102 of the cover 18 also includes a circular collar-like projection 108 that encircles the spring stop 94 at its top portion when the cover 18 is mounted in position on the valve housing 16. The spring stop 94 projects from the bottom wall 24 of the valve housing 16 more than the center post 46, and the cover post 106 extends from the inner side 102 of the cover 18 further than the projection 108.

The cover 18 also includes an arcuate extension 121 that fits into the slot 72 above the neck 70 of the actuator arm 68 when the cover 18 is in place on the valve housing 16. The arcuate extension 121 also prevents improper installation of the cover 18 on the valve housing 16.

Referring to FIGS. 1 and 2, the outer side 104 of the cover 18 includes a first trim strip 110 formed integrally therewith that extends diametrically across the cover 18 and terminates with each end in alignment with one of a pair of trim strips 112 and 114 extending from the sidewall 26 of the valve housing 16. The trim strips 112 and 114 extend from diametrically opposed locations in which one is adjacent the exhaust port 44 and the other is adjacent the angular slot 72. The trim strips 112 and 114 are also generally parallel to the axis of rotation 28.

The bottom wall 24 of the valve body 16 also includes a trim strip 116 that is formed integrally therewith and that extends diametrically across the bottom wall 24 generally parallel with the first rib 110, when the cover is on the valve housing 16. This trim strip 116 terminates integrally with the trim strips 112 and 114 of the side wall 26. The purpose of the trim strips 110, 112, 114 and 116 is to cover any gap (as indicted by reference numeral 121, FIG. 5) that may exist when the valve assembly 10 is secured in a mounting hole in the vehicle adjacent the seat.

The valve assembly 10 is designed for snap fit mounting into the dedicated recess in the seat for the seating system. A typical mounting hole is rectangular and includes a top edge 125 and bottom edge 124. The valve assembly 10 includes a wedge shaped projection 126 extending radially from the sidewall 26 between the trim strip 112 and the exhaust port 44. The projection 126 engages the top edge 125 and allows the valve assembly 10 to be pivoted into the hole.

Diametrically opposite the projection 126, the valve assembly 10 includes a biased spring catch 128 to secure it at the bottom edge 124. The spring catch 128 takes the form of a hook that opens towards the trim strip 114 and has an outer cam surface 130. The cam surface slides against the bottom edge 124 as the valve assembly 10 is pivoted into the hole to force the catch 128 toward the valve housing 16. Once the valve assembly 10 is rotated all the way into engagement with the trim strip 114 the biasing force of the catch 128 causes the distal end 132, which deflects inward toward the valve housing 16, to bias and clamp the lowered end against the trim strip 114 to lock the valve assembly 10 in position. To remove the valve assembly 10, the catch 128 is manually pressed against the valve housing 16 so that it can rotate over the bottom edge 124.

The valve housing 16 also includes a generally planar wall 134 that is integrally formed with and generally tangential to the sidewall 26 adjacent trim strip 112. The wall 134 has a surface capable of displaying instructional information for operation of the valve assembly 10. Such information may include the direction to move the actuator 68 to either inflate or deflate the bladder.

With the exception of the barbed fitting and retainer, the components of the valve assembly are to be molded or otherwise formed from a sturdy, lightweight material, such as M90 Celcon Acetal Copolymer, to have the low profile configuration described above.

Referring to FIGS. 8–10, there is illustrated an alternate embodiment of an air valve assembly 200 embodying features of the present invention. The valve assembly 200 enhances control and governing of air flow through the valve assembly 200. The valve assembly 200 includes a valve housing 202 and a cover (not shown) defining an internal cavity 204. The valve housing 202 includes an inlet port 206, an outlet port 208 and an exhaust port 210. A valve disk 212 having a generally wedge-shaped valve body 214 sits in the internal cavity 204 for rotation about a center axis 216 extending through the center of the valve body 214. The valve body 214 includes an internal passage 218 that has a main portion 220 interconnecting an inlet portion 222 and an outlet portion 224. The main portion 220 terminates beyond the outlet portion 224 with an exhaust portion 226. An actuator arm 215 extending from the valve disk 212, is used to manually rotate the valve disk 212 about the center axis 216.

To connect a supply line 203 and a vent line 205, the valve housing 202 also includes a radially extending inlet socket 228 at the inlet port 206 and an adjacent radially extending outlet socket 230 at the outlet port 208. The inlet and outlet sockets 228 and 230 are designed to receive an inlet barbed fitting 232 and an outlet barbed fitting 234, respectively. The inlet and outlet barbed fittings 232 and 234 include a first end 232a and 234a, respectively, that inserts into their respective socket 228 and 230, and barbs 236 on the fittings 232 and 234 lock into the walls of the socket 228 and 230 to prevent removal therefrom. The inlet and outlet barb fittings 232 and 234 also include a second end 232b and 234b, respectively. The supply and vent lines 203 and 205 slide over the second end 232b and 234b of the inlet and outlet barbed fittings 232 and 234, respectively, and barbs 236 on the fittings 232 and 234 grip the supply and vent lines 203 and 205 to prevent their removal therefrom.

The inlet and outlet barbed fittings 232 and 234 also include an internal passage 238 and 240, respectively, that is in sealed communication with the inlet and outlet ports 206 and 208, respectively. A seal 242 lines each of the inlet and outlet ports 206 and 208 to seal between the second ends 232b and 234b of the barbed fittings 232 and 234 and the valve disk 212.

The cross-sectional diameter of the passages of the barbed fittings 232 and 234, the inlet and outlet ports 206 and 208 and the main, inlet, outlet and exhaust portions 220, 222, 224 and 226 of the internal passage 218 of the valve passage body 214 are coordinated to provide the desired amount of reduced pressure through the valve assembly 200 between the supply and vent lines 203 and 205. The internal passage 238 of the inlet barbed fitting 232 includes an outer portion 248 and an inner portion 250 of lesser diameter and separated from the outer portion 248 by an orifice 252. The orifice 252 is preferably located longitudinally along the internal passage 238 more toward the inlet port 206. Accordingly, the outer portion 248 is longer than the inner portion 250 of the internal passage 238 of the inlet barbed fitting 232. The orifice 252 reduces the amount of air flow into the valve assembly 200. The reduced air flow desensitizes the valve performance and reduces the amount of air that is required to flow through the exhaust portion 226 to provide the desired pressure reduction by the valve assembly. Not only does reduced exhaust enhance valve performance, but it also reduces noise associated with exhausting air from the valve assembly through the exhaust portion 226 of the internal passage 218 of the valve body 214.

For instance, the preferred outer portion of the internal passage of the inlet barbed fitting has a diameter of about 0.070±0.0005 in., and the inner portion has a diameter of about 0.0355±0.0005 in. The orifice between the outer and inner portions is located at this reduction in diameter in the internal passage of the inlet barbed fitting. For example, the preferred inlet barbed fitting has an overall length of about 0.81±0.0025 in., and the inner portion has a length of about 0.060–0.080±0.0025 in. As discussed above, the purpose of the orifice is to reduce the air flow through the valve and, therefore, the orifice, alternatively, can be located anywhere within or on the valve housing, such as in the inlet port or in the socket portion of the valve housing preceding the inlet port.

The internal passage 254, defined by the seal 242, has a diameter less than that of the outer portion 248 and greater than that of the inner portion 250 of the internal passage 238 of the inlet barbed fitting 232. The internal passage 240 of the outlet barbed fitting 234 has the same diameter as the outer portion 248 of the internal passage 238 of the inlet barbed fitting 232. The outlet port 208 includes an internal passage 256, defined by the seal 242, that has the same diameter as that for the internal passage 254 through the inlet port 206. The diameter of the outlet port 208 is less than that of the internal passage 240 of the outlet barbed fitting 234. For instance, the preferred internal passage of the outlet barbed fitting has a diameter of about 0.070±0.0005 in., and the preferred internal passages of the outlet and inlet ports, defined by the seal, have a diameter of about 0.065±0.0005 in.

The inlet portion 222 and the outlet portion 224 of the internal passage 218 extend radially through the valve passage body 214. As with the valve assembly of FIGS. 1–7, previously described, when the valve disk 212 is rotated to its maximum counter-clockwise position in the internal cavity 204, the inlet portion 222 of the internal passage 218 aligns with the inlet port 206 and the outlet portion 224 aligns with the outlet port 208 for filling operations. The exhaust portion 226 aligns generally with the exhaust port 208 to allow flow to exhaust from the valve housing 202 during filling operations. When the valve disk 212 is rotated to its maximum clockwise position, the inlet portion 222 aligns with the outlet port 208, and the outlet portion 224 aligns with the exhaust port 210 for venting operations. Otherwise, a spring 256 cooperates with a spring stop 257 to normally bias the valve disk 212 to an intermediate off position in which the inlet and outlet ports 206 and 208 are closed by the valve passage body 214 of the valve disk 212.

The diameter of both the inlet and outlet portions 222 and 224 of the internal passage 218 of the valve passage body 214, is the same. For instance, the preferred diameter for the inlet and outlet portions of the internal passage of the valve passage body is about 0.060±0.0005 in.

The main portion 220 has an increasing cross-section over its longitudinal length from the inlet portion 222 to the exhaust portion 226. The increase rate is preferably constant and forms a frustoconical-like shape for the main portion. The preferred frustoconical-like shape of the main portion of the internal passage not only enhances control of the pressure reduction through the valve but also facilitates ease of manufacturing, especially the molding and ejecting of the valve disk from the mold cavity. For instance, the preferred diameter of the main portion at the connection with the inlet portion is about 0.063±0.0005 in. and at the connection with the exhaust portion is about 0.067±0.0005 in. The preferred rate of increase is constant at about 0.50±0.05 degrees over the longitudinal length of the main portion.

The exhaust portion 226 exhausts a predetermined amount of air to provide the desired reduction in pressure through the valve assembly 200. The exhaust portion 226 is designed to be fitted with a low pressure plug 258 that includes a pass through passage 260. The plug 258 inserts into the exhaust portion 226 with a tight seal fit so that air exhausts only through the passage 260. The plug 258 includes an annular barb 262 that allows insertion of the plug 258 into the exhaust portion and penetrates the interior wall of the exhaust portion 226 to prevent the plug 258 from being blown or otherwise dislodged from the exhaust portion 226. The plug 258 also includes a chamfered exterior surface 264 preceding the barb 262 to guide and otherwise assist the insertion of the plug 258 into the exhaust portion 226. The diameter of the pass through passage 260 is less than the maximum diameter of the main portion 220 of the internal passage 218 of the valve passage body 214 at the exhaust portion 226. For instance, the preferred pass-through passage has a diameter of about 0.065±0.0005 in.

The low pressure plug may be made from any suitable material that is sufficiently hard to allow the barb to be inserted into the exhaust portion and to cause it to penetrate the material of the valve passage body forming the exhaust portion. The preferred material for the plug is brass CA 360 or CA 345 or any other metal of sufficient hardness in order to penetrate a valve passage body made of plastic-type material, such as M90 Celcon Acetal Co-Polymer. The above-described dimensions for the valve assembly of FIGS. 8–10 enable such assembly to reduce air pressure in the range found typically in truck systems to the range necessary to operate with flexible bladders commonly used in truck seating systems. For instance, a valve assembly having the structure of valve assembly 200 has been found to reduce air pressure from the range of about 80 to 100 lbs. to the range of about 7 to 9±1.0 lbs.

Referring to FIG. 10, to convert the valve assembly 200 to a high pressure valve system, a high pressure plug 266 replaces the low pressure plug 258 in the exhaust portion 226 of the internal passage 218 of the valve body 214. The high pressure plug 266 is similar to the low pressure plug 258 but does not include an internal passage to allow air to exhaust from valve body 214. With the high pressure plug 266, all the air passes through the valve body 214 and out through the outlet port 208 during filling operations. Thus, the valve assembly 200 does not reduce the pressure. In addition, the high and low pressure plugs 258 and 266 can be used with the valve assembly 10 to replace the stop ball 78 in the exhaust portion 66.

Although the above-described dimensions are preferred, other dimensions for the ports and passages of the valve assembly can be selected to operate in accordance with the present invention. In all other respects, the structure and operation described previously for valve assembly 10 applies to valve assembly 200, including the material and dimensions for the valve housing, valve disk and barbed fittings.

It will be understood that various changes in the detail, materials and arrangement of parts and assemblies which have been herein described and illustrated in order to explain the nature of the present invention may be made by those skilled in the art within the principle and scope of the present invention as expressed in the appended claims.

What is claimed is:

1. A valve assembly for controlling flow comprising:

a valve housing defining an inlet port and an outlet port;

a valve operator located within the valve housing and having a body portion seated in the valve housing for rotation about an axis of rotation adjacent the body portion, the body portion defining an internal passage having an inlet end and an outlet end, the body portion being rotatable a first predetermined distance to a fill position in which the inlet end aligns with the inlet port and the outlet and aligns with the outlet port to allow flow through the valve assembly; and a spring adjacent the body portion of the valve operator between the axis of rotation and the valve housing, the spring extending at least partially about the axis of rotation to bias the body portion to an off position to substantially prohibit flow through the internal passage when the body portion is not being actuated to the fill position.

2. A valve assembly in accordance with claim 1 wherein the body portion of the valve operator is rotatable a second predetermined distance to a vent position in which the inlet end aligns with the outlet port to allow flow to vent from the valve assembly through the outlet end and the off position is intermediate the fill and vent positions to substantially prohibit flow through the internal passage when the body portion is not being actuated to the fill and vent positions.

3. A valve assembly in accordance with claim 2 wherein the valve operator includes an outer portion that defines an inner space extending partially about the axis of rotation and the spring being located substantially within the inner space to bias the body portion to the off position.

4. A valve assembly in accordance with claim 3 wherein the valve housing includes at least one stop to limit rotational movement of the body portion about the axis of rotation to the first predetermined distance for the fill position and to the second predetermined distance for the vent position.

5. A valve assembly in accordance with claim 3 wherein the spring is integrally formed from the body portion.

6. A valve assembly in accordance with claim 3 wherein at least a portion of the spring deforms toward the axis of rotation when the body portion of the valve operator is rotated to the fill and vent positions.

7. A valve assembly in accordance with claim 6 wherein the spring includes a plurality of lobes that extend partially about the axis of rotation and at least two lobes having at least one intersection that shifts toward the axis of rotation when the body portion is rotated to the fill and vent positions.

8. A valve assembly in accordance with claim 7 wherein each lobe extends from the body portion of the valve operator to the at least one intersection and the valve housing further comprising a stop extending between at least two lobes of the spring at the at least one intersection, the spring engaging the stop to bias the body portion to the off position when the body portion is not actuated to the fill and vent positions, the stop deforming the spring and causing the at least one intersection to shift toward the axis of rotation when the body portion is actuated to the fill and vent positions.

9. A valve assembly in accordance with claim 2 wherein the internal passage includes an exhaust passage portion to exhaust flow from the internal passage to reduce pressure between the inlet end and the outlet end of the internal passage.

10. A valve assembly in accordance with claim 9 wherein the internal passage defines an orifice to reduce flow volume through the internal passage.

11. A valve assembly in accordance with claim 10 wherein the internal passage includes a radially extending inlet portion terminating with the inlet end and a radially extending outlet portion terminating with the outlet end.

12. A valve assembly in accordance with claim 11 wherein the orifice is defined by the inlet portion of the internal passage.

13. A valve assembly in accordance with claim 10 wherein the internal passage includes a portion with a varying cross-section dimension.

14. A valve assembly in accordance with claim 2 wherein the internal passage includes an exhaust passage portion to exhaust flow from the internal passage to reduce pressure between the inlet end and outlet end of the internal passage.

15. A valve assembly in accordance with claim 14 further comprising a plug fitted in the exhaust passage portion to control exhaust flow from the exhaust portion.

16. A valve assembly in accordance with claim 15 wherein the plug substantially prevents flow through the exhaust passage portion.

17. A valve assembly in accordance with claim 14 wherein the internal passage includes a radially extending inlet portion terminating with the inlet end and a radially extending outlet portion terminating with the outlet end.

18. A valve assembly in accordance with claim 17 wherein an orifice is located within the inlet portion to reduce flow volume through the internal passage.

19. A valve assembly in accordance with claim 18 wherein the internal passage includes a portion with a varying cross-section dimension.

20. A valve assembly in accordance with claim 2 wherein the valve housing includes an orifice to reduce flow into the internal passage.

21. A valve assembly in accordance with claim 20 wherein the orifice precedes the inlet port.

22. A valve assembly in accordance with claim 21 wherein the internal passage includes a portion with a varying cross-section dimension.

23. A valve assembly in accordance with claim 2 that further comprises a supply line coupling attached to the valve housing at the inlet port and the supply line coupling defines an orifice to reduce flow volume through the inlet port.

24. A valve assembly in accordance with claim 23 wherein the internal passage includes a portion with a varying cross-section dimension.

25. A valve assembly for controlling flow comprising:

a valve housing having an internal arcuate guide surface and defining an inlet port and an outlet port;

a valve operator located in the valve housing, the valve operator having a top edge portion and bottom edge portion and defining an internal passage guided by the internal arcuate guide surface for movement about an axis of rotation, the internal passage having an inlet end and an outlet end;

an actuator for rotating the internal passage of the valve operator about the axis of rotation between a fill position in which the inlet end aligns with the inlet port and the outlet end aligns with the outlet port to allow flow through the valve assembly and to a vent position in which the inlet end aligns with the outlet port to allow flow to vent from the valve assembly through the outlet end; and a spring located within the valve operator generally between the top edge portion and bottom edge portion of the valve operator to bias the internal passage to an off position to substantially prohibit flow through the internal passage when the internal passage is not being actuated to the fill and vent positions.

26. A valve assembly in accordance with claim 25 wherein the spring extends partially about the axis of rotation to bias the internal passage to the off position located intermediate the fill and vent positions.

27. A valve assembly in accordance with claim 26 wherein the valve operator defines an exhaust passage in communication with the internal passage for allowing a portion of the flow to exit the valve assembly through the exhaust passage to reduce pressure between the inlet end and the outlet end of the internal passage when the internal passage is set to the fill position.

28. A valve assembly in accordance with claim 27 wherein the internal passage defines an orifice to reduce flow volume through the internal passage.

29. A valve assembly in accordance with claim 26 wherein the valve housing includes a spring stop, the spring includes a pair of arcuate segments that have an intersection at a first predetermined distance from the axis of rotation, and the spring stop shifts the intersection to a second predetermined distance from the axis of rotation when the internal passage is actuated to the fill and vent positions, the second predetermined distance being less than the first predetermined distance.

30. A valve assembly in accordance with claim 29 further comprising a removable cover that attaches to the valve housing and extends over the spring.

31. A valve assembly in accordance with claim 27 wherein the valve housing defines an orifice to reduce flow into the internal passage.

32. A valve assembly in accordance with claim 27 further comprising a supply line coupling attaching to the valve housing in communication with the inlet port and the supply line coupling defines an orifice to reduce flow into the internal passage.

33. A valve assembly for controlling flow comprising:

a valve housing defining an inlet port and an outlet port;

a valve operator located within the valve housing for rotation about an axis of rotation and defining an internal passage having an inlet portion, an outlet portion and an exhaust passage to exhaust flow intermediate the inlet and outlet portions, the valve operator being rotatable a first predetermined distance to a fill position in which the inlet end aligns with the inlet port and the outlet end and aligns with the outlet port to allow flow through the valve assembly and the exhaust portion exhausting flow from the internal passage to provide a predetermined reduction in pressure between the inlet portion and the outlet portion; and a spring operating between the valve operator and the valve housing, the spring biasing the valve operator to an off position to substantially prohibit flow through the internal passage when the valve operator is not being actuated to the fill position.

34. A valve assembly in accordance with claim 33 wherein the valve operator is rotatable a second predetermined distance to a vent position in which the inlet end aligns with the outlet end and the off position is intermediate the fill and vent positions to substantially prohibit flow through the internal passage when the valve operator portion is not being actuated to the fill and vent positions.

35. A valve assembly in accordance with claim 33 wherein the internal passage includes an orifice to reduce air flow volume between the inlet port and the outlet port.

36. A valve assembly in accordance with claim 34 wherein the valve housing includes a flow reducing passage to reduce the flow through the internal passage of the valve operator.

37. A valve assembly in accordance with claim 36 wherein the flow reducing passage includes an orifice to restrict flow into the internal passage of the valve operator.

38. A valve assembly in accordance with claim 37 wherein the internal passage includes a portion with a varying cross-sectional diameter.

39. A valve assembly in accordance with claim 33 further comprising a supply line coupling attached to the housing and aligned with the inlet port and the supply line coupling including an orifice to reduce flow into the internal passage of the valve operator.

40. A valve assembly in accordance with claim 33 further comprising a plug fitted into the exhaust portion to control exhausting from the internal passage of the valve operator.

41. A valve assembly in accordance with claim 40 wherein the plug substantially prevents exhausting from the exhaust portion of the internal passage of the valve operator.

42. A valve assembly in accordance with claim 33 wherein the valve operator defines an inner space extending partially about the axis of rotation and the spring being located substantially within the inner space of the valve operator to bias the valve operator to the off position.

* * * * *

UNITED STATES PATENT AND TRADEMARK OFFICE
CERTIFICATE OF CORRECTION

PATENT NO. : 5,983,940
DATED : Novemver 16, 1999
INVENTOR(S) : Rodney F. SMITH

It is certified that error appears in the above-identified patent and that said Letters Patent is hereby corrected as shown below:

In the Claims:

Claim 1, column 15, line 32, change "and" (second occurrence) to --end--.

Claim 33, column 18, line 10, change "and" (second occurrence) to --end--.

Signed and Sealed this

Twenty-second Day of August, 2000

Attest:

Q. TODD DICKINSON

Attesting Officer    Director of Patents and Trademarks